United States Patent
Tomiya et al.

[11] Patent Number: 5,942,028
[45] Date of Patent: *Aug. 24, 1999

[54] PROCESS FOR PRODUCING PRINTING INK

[75] Inventors: Nobuyuki Tomiya; Mikio Hayashi; Hideto Noguchi, all of Tokyo, Japan

[73] Assignee: Toyo Ink Manufacturing Co., Ltd., Tokyo, Japan

[*] Notice: This patent is subject to a terminal disclaimer.

[21] Appl. No.: 08/930,428

[22] PCT Filed: Feb. 5, 1997

[86] PCT No.: PCT/JP97/00275

§ 371 Date: Oct. 6, 1997

§ 102(e) Date: Oct. 6, 1997

[87] PCT Pub. No.: WO97/28224

PCT Pub. Date: Jul. 8, 1997

[30] Foreign Application Priority Data

Feb. 5, 1996 [JP] Japan ................................. 8-18491
Dec. 2, 1996 [JP] Japan ............................... 8-321263

[51] Int. Cl.$^6$ .................................................. C09D 11/02
[52] U.S. Cl. ...................... 106/31.78; 106/412; 106/413
[58] Field of Search .............................. 106/31.78, 413, 106/412

[56] References Cited

U.S. PATENT DOCUMENTS

| | | | |
|---|---|---|---|
| 3,017,414 | 1/1962 | Minnich et al. | 106/413 |
| 4,024,154 | 5/1977 | Jackson | 106/413 |
| 4,369,272 | 1/1983 | Jaffe | 106/411 |
| 4,371,642 | 2/1983 | Jaffe | 106/411 |
| 4,478,968 | 10/1984 | Jaffe | 106/411 |
| 4,522,654 | 6/1985 | Chisvette et al. | 106/412 |
| 5,175,282 | 12/1992 | Roth et al. | 540/141 |
| 5,492,563 | 2/1996 | Urban | 106/413 |
| 5,772,750 | 6/1998 | Tomiya et al. | 106/413 |
| 5,776,237 | 7/1998 | Tomiya et al. | 106/412 |

FOREIGN PATENT DOCUMENTS

| | | |
|---|---|---|
| 2013064 | 10/1990 | Canada . |
| 0 281 720 | 9/1988 | European Pat. Off. . |
| 0 407 831 | 1/1991 | European Pat. Off. . |
| 0 774 494 | 5/1997 | European Pat. Off. . |
| 2 143 945 | 2/1973 | France . |
| 081168 | 4/1988 | Japan . |
| 294365 | 12/1990 | Japan . |
| 041369 | 2/1996 | Japan . |

*Primary Examiner*—Helene Klemanski
*Attorney, Agent, or Firm*—Oblon, Spivak, McClelland, Maier & Neustadt, P.C.

[57] ABSTRACT

High quality β-form copper phthalocyanine pigment printing ink is produced by the present method, this method reducing the large amount of time and labor required in the process of pigmentation of crude copper phthalocyanine and production of the pigment printing ink.

To this end, the production method of printing ink according to the present invention is characterized by adding to crude copper phthalocyanine, 20–80 weight % of printing ink resin based on the amount of the crude copper phthalocyanine, dry-milling the mixture at 80–170° C., and heating the ground material in printing ink solvent. The printing ink obtained contains copper phthalocyanine particles of β-form crystals with an aspect ratio of 1–2.

8 Claims, No Drawings

PROCESS FOR PRODUCING PRINTING INK

FIELD OF THE INVENTION

The present invention relates to a method for producing printing ink using β-form copper phthalocyanine pigment as a colorant in which the printing ink is produced directly from crude copper phthalocyanine without pigmentation of the β-form copper phthalocyanine. In addition, the present invention relates to a method for producing printing ink of high quality by a simplified process, with the aspect ratio of the primary particles of the pigment in the ink being 1–2.

BACKGROUND OF THE INVENTION

Copper phthalocyanine as synthesized is referred to as crude copper phthalocyanine and is not suitable as a pigment for printing ink since it consists of large β-form crystal particles having a particle size of approximately 10 to 200 µm. The process to reduce the size of this crude copper phthalocyanine to a size (approximately from 0.02 to 0.1 µm) suitable for printing ink is called pigmentation. Printing ink is obtained using pigmentized copper phthalocyanine.

There are various methods for pigmentation. The most common method is salt milling which uses a solvent (hereinafter referred to as a solvent salt milling method). This method is one in which a milling agent such as sodium chloride and an organic solvent which promotes crystal transformation to the β-form are added to crude copper phthalocyanine and the resulting mixture is subjected to the milling process. The β-form copper phthalocyanine pigment produced by this method is suitable for printing ink and is widely used since the aspect ratio of the pigment particle is from 1 to 2 and it has clear greenish hue with strong color strength. However, this method requires an amount of milling agent several times that of the pigment and also consumes considerable time, labor and energy in recovering the milling agent and organic solvent.

An alternative method is known in which crude copper phthalocyanine is dry milled and then treated with an organic solvent. As a portion of the β-form crystals are transformed to α-form crystals in this process due to the mechanical force applied during milling, the ground material is heat treated with an organic solvent in order to transform the α-form crystals back to β-form crystals. This method is favourable costwise as compared to the solvent salt milling method but involves problems such as the increase in the aspect ratio of the pigment particle due to acicular growth of the particles during heat treatment in organic solvents, the hue turning reddish and the decrease in fluidity etc. Methods are known for suppressing particle growth by adding pigment derivatives or growth inhibitors but these additives are usually unfavourable ingredients for printing ink.

On the other hand, for production of printing ink from pigments, methods using dry pigments or wet cake pigments which contain 40–70 weight % of water are generally used. The method using wet cake pigments is called flushing method. In the method using dry pigments, the pigment is dispersed using beads mill, three roll mill, etc. after mixing the dry pigment with printing ink varnish, solvents, additives, etc. A large amount of energy is required, however, to disperse the pigment as the primary particles of dry pigments are susceptible to aggregation. In the flushing method, the pigment is converted from the water phase to the varnish phase by mixing the wet cake with printing ink varnish, solvent, additives, etc. Although the energy required for this method is less than that of the dry pigment method, large installations such as a kneader are necessary and drainage occurs during the flushing process.

As indicated above, the process of pigmentation and the production of ink requires a large amount of time and energy for producing printing ink from β-form copper phthalocyanine.

In order to provide low cost ink, production of ink directly from crude copper phthalocyanine without going through the stage of pigmentation may be conceived. However, the milling efficiency is low when printing ink is produced directly by mixing crude copper phthalocyanine with printing ink varnish, because the conventional pigmentation process is performed in the presence of printing varnish in this case. For instance, the use of a dispersing mill using ultrafine beads require a large amount of energy. And moreover, the quality of the product is problematic.

In Japanese Patent Publication No. S55-6670, a method for producing ink from crude copper phthalocyanine dry ground once is described. In this method, dry grinding is effective as it can be performed efficiently. But, due to the fact that the resulting ground material is a mixture of α/β-form crystals, the α-form crystals in the ink has to be reconverted to β-form crystals. Transformation from the α-form crystals to β-form crystals may be effected by heating in an organic solvent. However, although this reconversion to β-form proceeds smoothly in gravure ink, progress is hampered in offset lithography ink. And the transformation to β-form crystals is very difficult in solvents such as AF Solvent (trade name), for which demand has enlarged in recent years. Furthermore, means to suppress crystal growth which proceeds in parallel with the crystal transformation is necessary.

It is known that in order to produce ink from ground copper phthalocyanine material efficiently, mitigation of the aggregation of the ground copper phthalocyanine is very effective and several methods have been proposed.

UK Patent No. 1224627 describes a method in which resin 1–8 times in quantity of the crude copper phthalocyanine is added when dry grinding crude copper phthalocyanine. The aggregation of copper phthalocyanine particles is mitigated by this method. However, the addition of such a large amount of resin incurs increased danger in resin sticking inside during dry milling. The temperature during milling must be held low to prevent sticking. However, it is difficult to obtain ground material with a high content of β-form copper phthalocyanine when milled at low temperatures. Moreover, due to the large aspect ratio of the pigment particles in the ink, obtained from the pigments ground according to this method, the ink assumes a reddish hue and cannot be said to be of desirable quality.

Japanese Patent Application Laid-Open No. H2-294365 discloses a method wherein resins such as rosin modified phenolics are added to crude copper phthalocyanine by 0.5–10 weight % based on the crude copper phthalocyanine in the process of dry grinding. This method necessitates a large amount of energy in the process of dispersion into printing ink varnish. Therefore, this method cannot be said to be superior to conventional printing ink production methods which use dry pigments. Moreover, methods are not presented to keep the aspect ratio of the pigment particles small in the printing ink and this problem remains unsolved.

SUMMARY OF THE INVENTION

The object of the present invention is to reduce the time and labor necessary in the process of pigmentation of crude copper phthalocyanine and the production of printing ink using the pigment, and yet to provide high quality β-form copper phthalocyanine printing ink.

The present invention is a method for producing printing ink containing copper phthalocyanine, using copper phthalocyanine, printing ink resin and printing ink solvent, which method is characterized by comprising the steps of; adding 20–80 weight % of printing ink resin to crude copper phthalocyanine, based on the amount of the crude copper phthalocyanine, dry milling the mixture under heat whereby ground material is obtained, and heating said ground material in printing ink solvent.

The present invention is also a method described above for producing printing ink, wherein the printing ink resin is selected from the group consisting of rosin modified phenolics resin, rosin modified maleic acid resin, petroleum resin, alkyd resin and mixtures thereof.

Furthermore, the present invention is a method described above for producing printing ink, wherein the printing ink resin is a rosin modified phenolics resin.

Moreover, the present invention is a method described above for producing printing ink, wherein the heating temperature of the mixture of the ground material and printing ink solvent is 80–170° C.

Furthermore, the present invention is a method described above for producing printing ink, wherein the heating temperature of the mixture of the ground material and printing ink solvent is 115–170° C.

Also the present invention is a method described above for producing printing ink, wherein the printing ink solvent is selected from the group consisting of high boiling point petroleum solvent, aliphatic hydrocarbon solvent, higher alcohol solvent and mixtures thereof.

Moreover, the present invention is a method described above for producing printing ink, wherein the solvent contained in the printing ink solvent is a hydrocarbon solvent which contains less than 1 weight % of aromatic components.

Also the present invention is a method described above for producing printing ink, wherein the dry milling process is performed at the temperatures above 80° C. and below the softening point of the printing ink resin.

The present invention is also a printing ink produced by the method described above.

Furthermore, the present invention is a printing ink produced by the method described above, wherein the aspect ratio of the β-form crystal particles in the β-form copper phthalocyanine is 1–2.

DESCRIPTION OF THE PREFERRED EMBODIMENT

A detailed description of the present invention is given in the following.

The β-form crystals in crude copper phthalocyanine transform to α-form crystals in the process of dry milling giving rise to a milled material of α/β mixed crystal form. The ratio of α-form crystals increases when dry milling performed at low temperatures, leading to increased burden in the later process of transforming back to β-form crystals. Moreover, as particle growth proceeds simultaneously with crystal transformation from the α-form to β-form, the aspect ratio of the resulting β-form crystals becomes unfavourably large. Dry milling must therefore be performed at high temperatures. On the other hand, due to the enhancement of aggregation of the ground material when milled at high temperatures, it is very difficult to produce ink directly, using only crude copper phthalocyanine dry milled at high temperatures.

According to the present invention, printing ink resin is added to crude copper phthalocyanine and the mixture dry milled under heat. The milling process according to the present invention enables reduction of enhanced aggregation which occurs when dry milled at high temperatures, and also reduces the percentage of crystals transforming to the α-form. As a result, the aspect ratio of final β-form crystal particles obtained is reduced and ink of high quality is obtained.

Due to the affinity of resin with both the pigment and printing ink solvent, printing ink resin serves the role of forming good quality ink by stabilizing the dispersion of the pigment in the solvent. Therefore, in the present invention, resins which substantially possess these functions may be used for printing ink. Rosin modified phenolics, rosin modified maleic acid, petroleum resin, alkyd resin, etc. are such examples which may arbitrarily be used singly or as mixtures of two or more species. The use of rosin modified phenolics is desirable. The main components of rosin modified phenolics are products obtained by reacting phenolic resin and rosin, the phenolic resin be obtained by condensation reaction of alkyl phenol and formaldehyde, but may also contain polyhydric alcohol.

The amount of printing ink resin added to crude copper phthalocyanine is 20–80 weight % based on the crude copper phthalocyanine. If the added quantity of resin is smaller than 20 weight % based on the crude copper phthalocyanine, the dispersibility of the ground material during the preparation of the printing ink by mixing with printing ink solvent, varnish etc. becomes inferior, and the grindability of the ink obtained deteriorates, leading to a substantial decrease in production efficiency. Inferior dispersibility of the ground material results in ink with low tinting strength and gloss, and also causes dullness of the hue of the printed material. On the other hand, excessive addition of resin incurs danger of giving rise to adhesion and cohesion of the resin inside the dry mill, necessitating maintenance of low temperature inside the apparatus to prevent this effect. However, as stated above, high milling temperature is necessary to obtain final β-form crystal particles with small aspect ratios. This, therefore, limits the upper level of the added quantity of resin.

By increasing the temperature of dry milling, the transformation to α-form crystals of the pigment is suppressed and, as the quantity requiring conversion to β-form crystals in a later process is small, danger in increase of the aspect ratio of the pigments in the ink is reduced. From this point of view, it is desirable to set the dry milling temperature at 80–170° C. Also, as there is a possibility of occurrence of adhesion and cohesion of the resin inside the apparatus when dry milling is conducted at temperatures above the softening point of the added resin, it is desirable to dry mill at temperatures below the softening point of the resin used.

In the present invention, dry milling of crude phthalocyanine is performed without the substantial presence of liquids by use of mills which contain milling media such as beads. The milling is executed by utilizing the milling and destructive forces due to the intercollision of the milling media. Known methods such as dry attritor, ball mill, vibration mill may be used as the dry milling apparatus. The milling time may also be set arbitrarily according to the apparatus used and the desired milled particle diameter.

Next, printing ink solvent is added to the ground material obtained by the dry milling described above, and heated. The printing ink solvent is a solvent which possesses proper evaporative power enabling the pigment after printing to be fixed quickly. Printing ink solvent is an organic solvent which has this function. Printing ink solvent may also be used in the form of a varnish, that is a mixture of resin and solvent.

Regardless of whether it contains aromatics or not, solvents appropriate for printing ink such as high boiling point petroleum solvent, aliphatic hydrocarbon solvent, higher alcohol solvent etc. may be suitably used. They can also be used singly or as an arbitrary mixture of two or more species.

For the present invention, printing ink solvent essentially composed of hydrocarbons such as naphthene, paraffin, etc., in which the aromatic component is less than 1 weight %, more preferably less than 0.5 weight %, may be used. Solvents with aniline points 65–100° C. are desirable. Such solvents which are available are, for example, AF Solvent No. 4 (NIPPON OIL CO., LTD.: its content of aromatic component is 0.1 wt. %), AF Solvent No. 5 (ditto 0.2 wt. %), AF Solvent No. 6 (ditto 0.2 wt. %), AF Solvent No. 7 (ditto wt. 0.3%).

When varnish is used, the resin contained in the varnish are, for example, rosin modified phenolics, rosin modified maleic acid resin, petroleum resin, alkyd resin, etc., which are adequate for printing ink. Varnish is prepared by mixing these resin appropriately with drying oil, polymerized drying oil, etc. such as soy bean oil, tung oil, linseed oil which are adequate for printing ink. The resins and solvents for varnish may be used singly or by combining 2 or more species, and other additives commonly used in producing printing ink may be added arbitrarily.

Ground crude copper phthalocyanine consists of α/β mixed form crystal particles containing α-form crystal which is transformed to β-form by mixing with printing ink solvent or varnish and heat treating. Transformation to β-form crystals proceeds easily when aromatic solvents are used but is difficult in other solvents. In the present invention, however, transformation to β-form crystals using non-aromatic solvents is made possible due to the affinity of the printing ink resin contained in the ground material to the pigment and printing ink solvent. Also the increase in the aspect ratio during transformation can be suppressed by using non-aromatic solvents. As a result, pigment with high percentage of β-form crystals with small aspect ratios is obtained.

With the production method of the present invention described above, copper phthalocyanine ink composed almost entirely of β-form crystals can be obtained. Needless to say, the existence of a small quantity of α-form crystals is all right as long as they are copper phthalocyanine pigment particles which are suited for ink.

The temperature to which the mixture of the ground material and the printing ink solvent (or varnish) is heated should be over 80° C., more preferably over 115° C., in order to enhance crystal transformation to the β-form crystal adequately. It is also desirable to keep the temperature below 170° C. in order to prevent crystal growth of the pigment.

There is no particular need for vigorous mixing using dispersers etc. during the heat treatment process. It is more desirable to mix gently so that dispersion occurs uniformly. The time required for sufficient dispersion and the transition of α-form crystals to β-form depends on the printing ink solvent used, but the heat treatment process may be completed in about several 10 minutes–3 hours. The base ink is obtained by grinding with a three roll mill. In particular, if reduction of the heat treatment process time is desired, the heat treatment may be performed employing a conventionally used beads mill disperser, under the condition of temperatures described above. This results in a large reduction in time.

The final ink is obtained by adding printing ink solvent, varnish, or other additives as needs demand to the base ink obtained as described above.

Comparison with ink produced from dry pigment by the conventional solvent salt milling method and ink produced by the flushing method using moist wet cake pigment, respectively, confirmed that the color strength, gloss, fluidity, etc. of the ink produced by the method of the present invention were of equal quality.

In particular, the aspect ratio of the primary particles of the pigment contained in the ink produced by the method of the present invention is in the range of 1–2, which is about the same as the primary particles of the pigment produced by the solvent salt milling method. Also the hue of the ink obtained has a clear greenish appearance and, taking into consideration the large reduction in the production process, the method of the present invention may be considered epoch-making for producing β-form copper phthalocyanine pigment ink.

EXAMPLES

In the following, specific description of the present invention is given with reference to some examples of ink preparation.

It is noted that the standard ink used in the following examples is a β-form copper phthalocyanine pigment ink produced by the flushing method using wet cake pigment pigmentized by solvent salt milling (salt 6 times in quantity) in which the aspect ratio of the pigment particles was about 1.2. The color strength was 1.94, the gloss 55.3%.

Also the color strength and the gloss of the standard ink described above and inks produced in the following examples of preparation were measured by printing 0.3 cc of each ink to art paper (250×270 cm) with a RI tester (Akira Seisakusho; RI-2), after the tack values (inkometer reading value) of the base inks were adjusted to be identical. The color strength was measured using PRESSMATE 110 Type densitometer (Cosar) and the gloss was evaluated by measuring 60° gloss using variable angle glossmeter (Suga Shikenki, Inc.).

A transmission type electron microscope was used to measure the aspect ratio (average value) of the primary particles and a X-ray diffractometer to measure the crystal structure.

Preparation 1

A dry attritor was charged with 70 weight parts of crude copper phthalocyanine and 21 weight parts of rosin modified phenolics with a softening point of 160° C. The resulting mixture was milled 1 hour at 130° C.

To 21 weight parts of the ground material obtained, 38 weight parts of printing ink varnish (composed of 47% rosin modified phenolics, 47% Solvent No. 7, 6% linseed oil) and 8 weight parts of Solvent No. 7 (NIPPON OIL CO.,LTD.) were added and, after mixing gently at 90° C. for 2 hours, ground once with a three roll mill at 60° C. As a result, base ink containing dispersion of pigment particles with particle diameters less than 5 μ was obtained.

Next, the final ink was prepared by adding 22 weight parts of varnish (described above), 11 weight parts of No. 7 Solvent to the base ink obtained. Comparison of the final ink obtained with the standard ink containing the same amount of pigment showed that qualities such as color strength, gloss, hue, etc. of the prepared ink were equal to that of the standard ink. The aspect ratio of the pigment particles in the ink was 1.4 and the amount of α-form crystals contained was less than 1%.

Preparation 2

A dry attritor was charged with 70 weight parts of crude copper phthalocyanine and 21 weight parts of rosin modified phenolics with a softening point of 160° C. The resulting mixture was milled for 1 hour at 130° C.

To 21 weight parts of the ground material, 38 weight parts of printing ink varnish (composed of 47% rosin modified phenolics, 47% AF Solvent No. 7, 6% linseed oil) and 8 weight parts of AF Solvent No. 7 (NIPPON OIL CO., LTD.) were added and, after mixing gently at 90° C. for 3 hours, ground twice with a three roll mill at 60° C. As a result, base ink containing dispersion of pigment particles with particle diameters less than 7.5 $\mu$ was obtained.

Next, the final ink was prepared by adding 22 weight parts of varnish (described above) and 11 weight parts of AF Solvent No. 7 to the base ink obtained. Comparison of the final ink obtained with the standard ink containing the same amount of pigment showed that qualities such as color strength, gloss, hue, etc. of the prepared ink were equal to that of the standard ink. The aspect ratio of the pigment particles in the ink was 1.4 and the amount of α-form crystals contained was less than 1%.

Preparation 3

A dry attritor was charged with 70 weight parts of crude copper phthalocyanine and 35 weight parts of rosin modified phenolics with a softening point of 160° C. The resulting mixture was milled for 1 hour at 130° C.

To 24 weight parts of the ground material obtained, 32 weight parts of printing ink varnish (composed of 47% rosin modified phenolics, 47% AF Solvent No. 7, 6% linseed oil) and 11 weight parts of AF Solvent No. 7 were added and, after mixing gently at 90° C. for 3 hours, ground once with a three roll mill at 60° C. As a result, base ink containing dispersion of pigment particles with particle diameters less than 5 $\mu$ was obtained.

Next, the final ink was prepared by adding 22 weight parts of varnish (described above) and 11 weight parts of AF Solvent No. 7 to the base ink obtained. Comparison of the final ink obtained with the standard ink containing the same amount of pigment showed that qualities such as color strength, gloss, hue, etc. of the prepared ink were equal to that of the standard ink. The aspect ratio of the pigment particles in the ink was 1.4 and the amount of α-form crystals contained was less than 1%.

Preparation 4

A dry attritor was charged with 70 weight parts of crude copper phthalocyanine and 21 weight parts of rosin modified phenolics with a softening point of 160 ° C. The mixture was milled for 1 hour at 160° C.

To 21 weight parts of the ground material obtained, 38 weight parts of printing ink varnish (composed of 47% rosin modified phenolics, 47% AF Solvent No. 7, 6% linseed oil) and 8 weight parts of AF Solvent No. 7 were added, and, after mixing gently at 90 ° C. for 3 hours, ground twice with a three roll mill at 60° C. As a result, base ink containing dispersion of pigments particles with particle diameters less than 7.5 $\mu$ was obtained.

Next, the final ink was prepared by adding 22 weight parts of varnish (described above) and 11 weight parts of AF Solvent No. 7 to the base ink obtained. Comparison of the final ink obtained with the standard ink containing the same amount of pigment showed that qualities such as color strength, gloss, hue, etc. of the prepared ink were equal to that of the standard ink. The aspect ratio of the pigment particles in the ink was 1.2 and the amount of α-form crystals contained was less than 1%.

Preparation 5

A dry attritor was charged with 70 weight parts of crude copper phthalocyanine and 35 weight parts of rosin modified phenolics with a softening point of 160° C. The resulting mixture was milled for 1 hour at 60° C.

To 24 weight parts of the ground material obtained, 32 weight parts of printing ink varnish (composed of 47% rosin modified phenolics, 47% AF Solvent No. 7, 6% linseed oil) and 11 weight parts of AF Solvent No. 7 were added and, after stirring gently at 90° C. for 3 hours, ground once with a three roll mill at 60° C. As a result, base ink containing dispersion of pigment particles with particle diameters less than 5 $\mu$ was obtained.

Next, the final ink was prepared by adding 22 weight parts of varnish (described above) and 11 weight parts of AF Solvent No. 7 to the base ink obtained. Comparison of the final ink obtained with the standard ink containing the same amount of pigment showed that the quality of the color strength, gloss, etc. were equal to that of the standard ink but assumed a reddish hue, the aspect ratio of the pigment particles being 3.6 and the amount of α-form crystals contained is less than 1%.

Preparation 6

A dry attritor was charged with 70 weight parts of crude copper phthalocyanine and 7 weight parts of rosin modified phenolics with a softening point of 160° C. The resulting mixture was milled for 1 hour at 130° C.

To 18 weight parts of the ground material obtained, 44 weight parts of printing ink varnish (composed of 47% rosin modified phenolics, 47% AF Solvent No. 7, 6 % linseed oil) and 5 weight parts of AF Solvent No. 7 were added and, after stirring gently for 3 hours at 90° C., ground 3 times with a three roll mill at 60° C. The maximum particle diameter of the pigment particles obtained was 12 $\mu$ and the particles did not disperse well.

Next, the final ink was prepared by adding 22 weight parts of varnish (described above) and 11 weight parts of AF Solvent No. 7 to the base ink. Comparison of the final ink obtained with the standard ink containing the same amount of pigment showed that the hue was dull and the color strength 1.88 and gloss 48.6%, inferior to that of the standard. The aspect ratio of the pigment particles in the ink was 1.4 and the amount of α-form crystals contained was less than 1%.

Preparation 7

A dry attritor Was charged with 70 weight parts of crude copper phthalocyanine and 70 weight parts of rosin modified phenolics with a softening point of 160° C. The resulting mixture was milled at 130° C. As a result, the mixture of resin and pigment was stuck to each other inside the attritor.

Industrial Applicability of the Invention

The method of the present invention greatly simplifies the conventional pigmentation process. Whereas similar methods for simplifying the pigmentation process entail, in many cases, increase in load for the ink production process, the method of the present invention keeps the ink production process load at conventional levels with possibilities for further reduction. Moreover, ink produced by the method of the present invention possesses qualities equal to ink produced from pigments prepared by the conventional salt solvent milling method.

What is claimed is:

1. A method for producing a printing ink containing copper phthalocyanine wherein the printing ink is produced with use of copper phthalocyanine, printing ink resin and printing ink solvent, said method comprising the steps of:

adding to a crude copper phthalocyanine, 20–80 weight % of a printing ink resin based on the amount of said crude copper phthalocyanine, to form a mixture;

dry milling the mixture under heat at a temperature above 80° C. and below the softening point of the printing ink resin whereby ground material is obtained; and, heating said ground material in a printing ink solvent such that the aspect ratio of β-form crystal particles in the copper phthalocyanine is from 1 to 2.

2. The method according to claim 1, wherein the printing ink resin is selected from the group consisting of rosin modified phenolics, rosin modified maleic acid resin, petroleum resin, alkyd resin and mixtures thereof.

3. The method according to claim 2, wherein the printing ink resin is rosin modified phenolics.

4. The method according to claim 1, wherein the heating temperature of the mixture of said ground material and printing ink solvent is 80–170° C.

5. The method according to claim 4, wherein the heating temperature of the mixture of said ground material and printing ink solvent is 115–170° C.

6. The method according to claim 1, wherein said printing ink solvent contains solvent selected from the group consisting of high boiling point petroleum solvent, aliphatic hydrocarbon solvent and higher alcohol solvent.

7. The method according to claim 6, wherein said printing ink solvent is a hydrocarbon solvent in which the aromatic component is less than 1 weight %.

8. Printing ink produced by the method of claim 1.

* * * * *

UNITED STATES PATENT AND TRADEMARK OFFICE
CERTIFICATE OF CORRECTION

PATENT NO. : 5,942,028

DATED : August 24, 1999

INVENTOR(S): Nobuyuki TOMIYA, et al.

It is certified that an error appears in the above-identified patent and that said Letters Patent is hereby corrected as shown below:

On the title page item [87] the PCT Publication date is incorrect. It should be:

--PCT Pub. Date: Aug. 7, 1997--

Signed and Sealed this

Thirteenth Day of June, 2000

Attest:

Q. TODD DICKINSON

*Attesting Officer*     *Director of Patents and Trademarks*